United States Patent Office 3,371,672
Patented Mar. 5, 1968

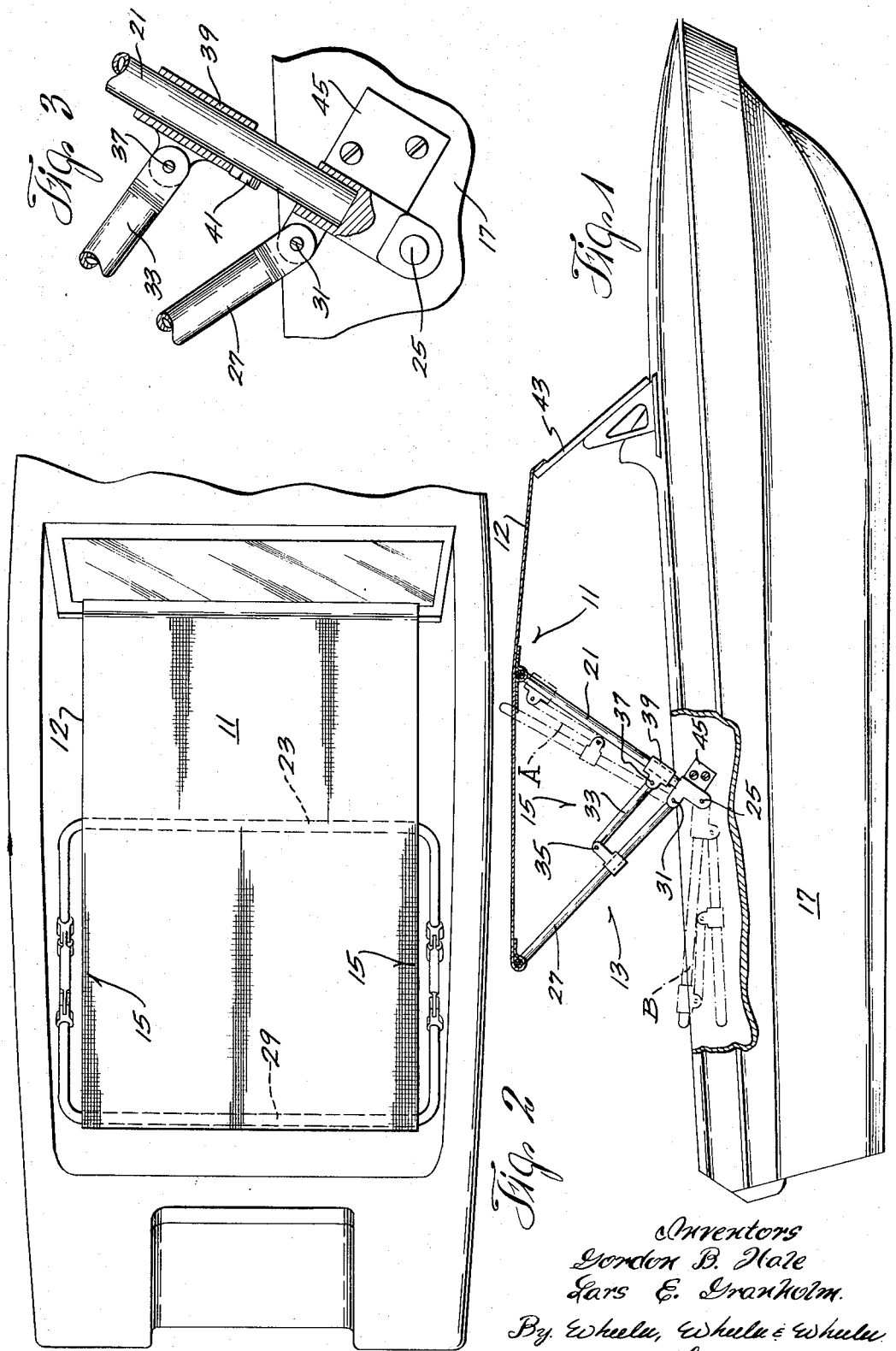

3,371,672
CONVERTIBLE TOP
Gordon B. Hale and Lars E. Granholm, Waukegan, Ill., assignors to Outboard Marine Corporation, Waukegan, Ill., a corporation of Delaware
Filed May 31, 1966, Ser No. 553,985
9 Claims. (Cl. 135—6)

ABSTRACT OF THE DISCLOSURE

Disclosed herein is a convertible top for a boat including a first link pivotally connected to a boat hull, a second link pivotally connected to the first link and means movable lengthwise of said first link and connected to said second link and acting over-center for establishing the soft top in erected condition.

---

The invention relates generally to convertible soft tops for vehicles, and more particularly to convertible soft tops for boat hulls.

According to the present invention, a three-link linkage, arrangement, or system, having an over-center action, is utilized to support a convertible soft top and maintain the top in a self-standing, erected position. The linkage system furnishes rigid support for the top in the erected position, and the soft top and its supporting linkage, when mounted on a vehicle or boat hull, is movable between a collapsed position for storage, a semi-erected position, and a self-standing, fully erected position.

When the linkage is rotated to the erected position from the storage position, forward positioning of the linkage is provided by abutments on a forward part of the boat hull. When the linkage is engaged against the abutments, the soft top cover is then releasably attached to the windshield and is subsequently rearwardly spread by separating a rear link from a forward link. A third linking member connecting the forward and rear links is then pushed over center and positioned against a stop on the forward link, thereby establishing the soft top in its erected position.

One principal object of the invention is to provide an improved convertible soft top for a vehicle body, such as a boat hull.

Another principal object of the invention is to provide a convertible soft top which can be easily and quickly raised to an erect position from a storage position.

Still another principal object of the invention is to provide a convertible soft top which, when spread, is releasably retained in spread condition due to resistance and increased tension in the cover accompanying movement and a collapsed condition.

Still another object of the invention is to provide a convertible soft top with varying roof coverage.

Another object of the invention is to provide a convertible soft top that is adaptable for use with multiple units.

Further objects of the invention are to provide a convertible soft top that is compact, lightweight, inexpensive, versatile, and trouble-free, for use with any vehicle, and more particularly, with a boat hull.

Other objects and advantages of the invention will become known by reference to the following description and accompanying drawings in which:

FIGURE 1 is a fragmentary side elevational view showing, in full lines, the convertible soft top in its erected position;

FIGURE 2 is a fragmentary top plan view of the soft top shown in FIG. 1; and

FIGURE 3 is a fragmentary side elevational view, partially in section, showing the linkage system employed in the soft top shown in FIG. 1.

Shown in FIGURE 1 in an erected position is a collapsible soft top 11. The soft top 11 includes a cover 12 made of any suitable water-repellant material such as treated canvas or duck cloth, and a cover supporting frame 13.

The frame 13 includes a pair of duplicate linkages 15 located at the sides of a boat hull 17. Each linkage includes a forward link 21 which comprises one leg of a U-shaped bow 23 pivotally connected to the boat hull 17 at two fixed pivots 25 mounted on the gunwale on the port and starboard sides of the hull. Each linkage also includes a rear link 27 which comprises one leg of a U-shaped bow 29. The ends of rear links 27 are respectively pivotally connected to the forward links 21 at pivots 31 spaced from the pivots 25.

The forward and rearward bows 23 and 29 are desirably constructed from lightweight hollow metal tubing that is easily shaped to the desired form.

Each of the linkages 15 also includes a connecting link or member 33 pivotally connected to the rear link 27 at a pivot 35 spaced from pivot 31. Each of the linkages 15 further includes means connecting said third link or member 33 to said forward link 21 for pivotal movement therebetween and for movement of the third link axially of said forward link 21. Thus, in the disclosed construction, such means includes, at the opposite end of each third or connecting link 33, i.e. the end adjacent to the forward link 21, a sliding sleeve or member 39 which is pivotally connected to the link 33 and which is telescopically slidable over the forward link 21 between a stop 41 on the forward link 21 spaced from the pivot 25 to the position shown in dotted outline and indicated at A in FIG. 1 where the link 33 is essentially parallel to forward link 21.

When links 21, 27 and 33 are in the relative positions shown in dotted outline at A in FIG. 1, the entire top 11 is rotatable about the pivots 25 to a collapsed stern-ward position, shown in dotted outline at B in FIG. 1, at the floor of the cockpit or the top of a rear deck. The convertible top 11 may be stored in collapsed condition at either of these two positions. Multiple units may be used on boats with long cockpits with one unit stored forward and another unit stored aft.

To erect the convertible top from a collapsed, retracted stern-ward position shown at B in FIG. 1, the linkages 15 are pivoted about the pivots 25 while the top is still in the collapsed condition. The leading edge of the canvas cover 12 is then fastened to the boat windshield 43, thereby preventing rearward rotation of the bow 23. Forward rotation of the links 21 is limited by a pair of abutments 45 on the inside of the gunwale on both the port and starboard sides of the hull. The rearward bow 29 is then pivoted stern-ward around the pivots 31 until the third links limit further rotation of the bow 29.

Maximum tension in the flexible top is reached when the angle between links 21 and the links 33 is approximately 90°. This is referred to as the center position of link 33. To complete the erection of the top 11, the links 33 are then moved past and over the center position to the stop 41 by manual movement of sleeves 39 downwardly towards the pivots 25.

When links 33 are in perpendicular relation to the links 21, the linkage forms a right triangle with the link segments between the pivot 31 and the pivot 37, forming the base, with the link segment between the pivot 31 and the pivot 35 forming the hypotenuse, and with the link 33 forming the other side. When the sleeve 39 is moved past the over-center position into contact with the abutment 41 thereby increasing the angle between the connecting link 33 and the forward link 21, the acute angle between the rearward link 27 and the connecting link 33 decreases slightly and the tension in the cover 12 decreases below maximum tension, whereby any unwanted tendency toward collapse of the frame is prevented.

More specifically, when the collecting link 33 is moved to the center position perpendicular to the link 21, the tension in the cover 12 results in maximum thrusting of the connecting link 33 against the forward link 21. Movement of the sleeve 39 from the position against the abutment 41 to the center position is opposed by the increased friction between the sleeve 39 and the forward link 21 effected by the increase in thrust of the connecting link 33 against the forward link 21 due to the increased tension in the cover 12.

In summary, disposition of the linkages 15 with the sleeves 39 in engagement with abutments 41 effectuates a transformation of the movable frame into a statically determinate triangular structure which provides the desired rigidity to support and maintain the top in the erected condition.

The frame can be collapsed from the erected condition by manual movement of sleeve 39 away from the abutment 41 and past the center position.

Various features of the invention are set forth in the claims.

What is claimed is:

1. The combination of a boat hull and a convertible soft top comprising a first link pivotally mounted to said boat hull, a second link pivotally connected to said first link, and means movable longitudinally of said first link and connected to said second link and acting over center for establishing said frame in erected condition.

2. A frame for a convertible soft top comprising a linkage including a first link adapted for pivotal mounting to a boat hull, a second link pivotally connected to said first link, a third link, a pivot connecting said third link to said second link at a point spaced from the pivotal connection of said first and second links, and means connecting said third link to said first link for pivotal movement therebetween and for movement of said third link axially of said first link.

3. A frame for a convertible soft top comprising a linkage including a first link adapted at one end for pivotal mounting to a boat hull, a second link having an end pivotally connected to said first link, a third link, a pivot connecting said third link to said second link at a point spaced from the pivotal connection of said first and second links, and a member pivotally connected to said third link and axially movable along said first link.

4. A frame for a convertible soft top comprising a linkage including a forward link having a stop and an end spaced from said stop and adapted for pivotal mounting to a boat hull, a rear link having an end pivotally connected to said forward link at a point between said stop and said end, a third link, a pivot connecting one end of said third link to said rear link at a point spaced from the pivotal connection of said forward and rear links, and a member pivotally connected to the other end of said third link and to said forward link for movement along said forward link from a first position remote from said stop wherein the third link is parallel to the forward link, past a second position less remote from said stop wherein said third link is perpendicular to said forward link, and to a third position adjacent to said stop wherein said forward and rear links are in erected condition.

5. A claim in accordance with claim 4 wherein said frame includes a duplicate pair of said linkages.

6. A frame in accordance with claim 5 including first and second U-shaped bows, said first U-shaped bow having ends constituting said forward links in said linkages and said second U-shaped bow having ends constituting said rear links in said linkages.

7. A frame in accordance with claim 4 wherein said member comprises a sleeve telescopically slidable on said forward link.

8. A soft top including a frame in accordance with claim 4 and a flexible cover carried by said frame.

9. The combination of a boat hull and a convertible soft top including a cover and a frame supporting said cover and movable between a collapsed storage position and an erect position, said frame comprising a bow-shaped forward link having spaced legs pivotally mounted to opposite sides of said boat hull, said legs respectively including stops spaced from the pivotal connection of said legs to said boat hull, a pair of abutments respectively positioned on opposite sides of said boat hull in position to limit forward rotation of said forward link, a bow-shaped rear link having spaced end portions respectively pivotally connected to said forward link legs at points between said stops and the pivotal mounting of said legs and said boat hull, a pair of connecting links, pivots respectively connecting said connecting links to said end portions of said rear link at points spaced from the pivotal connections of said end portions to said forward link, and means for connecting the other ends of said connecting links on said legs of said forward link, said means being movable on said legs to each side of an on-center position locating said connecting links in perpendicular relation to said forward link, including movement to a frame erecting position against said stop on one side of said on-center position, thereby locating and maintaining said forward and rear links in an erected condition.

References Cited
UNITED STATES PATENTS

| | | | |
|---|---|---|---|
| 974,072 | 10/1910 | Kenyon | 135—6 |
| 1,014,553 | 1/1912 | Zellers | 296—107 |
| 1,052,076 | 2/1913 | McClellan | 135—6 |

REINALDO P. MACHADO, *Primary Examiner.*